US009107103B2

(12) United States Patent
Fong et al.

(10) Patent No.: US 9,107,103 B2
(45) Date of Patent: Aug. 11, 2015

(54) SMALL DATA COMMUNICATIONS IN A WIRELESS COMMUNICATION NETWORK (71) Applicant: Intel Corporation, Santa Clara, CA (US)

(72) Inventors: Mo-Han Fong, Sunnyvale, CA (US); Sangeetha L. Bangolae, Beaverton, OR (US); Marta Martinez Tarradell, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 105 days.

(21) Appl. No.: 13/734,371

(22) Filed: Jan. 4, 2013

(65) Prior Publication Data
US 2013/0272148 A1 Oct. 17, 2013

Related U.S. Application Data (60) Provisional application No. 61/624,185, filed on Apr. 13, 2012.

(51) Int. Cl.
*H04L 12/66* (2006.01)
*H04W 28/08* (2009.01)
(Continued)

(52) U.S. Cl.
CPC .............. *H04W 28/08* (2013.01); *H04L 5/0001* (2013.01); *H04W 24/02* (2013.01); *H04W 28/02* (2013.01); *H04W 36/08* (2013.01); *H04W 72/04* (2013.01); *H04W 72/042* (2013.01); *H04W 74/0808* (2013.01); *H04W 76/023* (2013.01); *H04W 24/10* (2013.01); *H04W 36/0016* (2013.01); *H04W 76/028* (2013.01); *Y02B 60/50* (2013.01)

(58) Field of Classification Search
CPC ... H04W 28/08; H04W 28/02; H04W 72/042; H04W 72/04; H04W 74/0808; H04W 36/08; H04W 76/023; H04W 24/10; H04W 36/016; H04L 5/001; Y02B 60/50
See application file for complete search history.

(56) References Cited

U.S. PATENT DOCUMENTS 8,416,741 B2 * 4/2013 Chan et al. .................... 370/329
2012/0093051 A1 * 4/2012 Xu .................................. 370/311
(Continued)

FOREIGN PATENT DOCUMENTS

KR 100705040 B1 4/2007
KR 1020100100017 A 9/2010
(Continued)

OTHER PUBLICATIONS

International Search Report and Written Opinion Received for International Application No. PCT/US2013/036364, mailed Jul. 26, 2013, 12 pages.
(Continued)

*Primary Examiner* — Robert Wilson
(74) *Attorney, Agent, or Firm* — Thorpe, North & Western, LLP (57) ABSTRACT Technology for enabling small data transmissions in a user equipment (UE) configured for machine type communication (MTC) is disclosed. One method comprises receiving, by the UE from an evolved node (eNB), a system information block (SIB). The SIB can include system information relating to small data transmissions for MTC. The system information included in the SIB is read by the UE. The small data transmission is performed, from the UE to the eNB, based on the system information included in the SIB.

21 Claims, 8 Drawing Sheets (51) Int. Cl.
  *H04W 28/02* (2009.01)
  *H04L 5/00* (2006.01)
  *H04W 72/04* (2009.01)
  *H04W 74/08* (2009.01)
  *H04W 36/08* (2009.01)
  *H04W 24/02* (2009.01)
  *H04W 76/02* (2009.01)
  *H04W 24/10* (2009.01)
  *H04W 36/00* (2009.01)

(56) References Cited

U.S. PATENT DOCUMENTS

| | | | |
|---|---|---|---|
| 2013/0080597 A1* | 3/2013 | Liao | 709/219 |
| 2013/0100895 A1* | 4/2013 | Aghili et al. | 370/329 |
| 2013/0155954 A1* | 6/2013 | Wang et al. | 370/328 |
| 2013/0223370 A1* | 8/2013 | Larmo et al. | 370/329 |
| 2013/0272148 A1* | 10/2013 | Fong et al. | 370/252 |
| 2013/0279372 A1* | 10/2013 | Jain et al. | 370/254 |
| 2013/0308564 A1* | 11/2013 | Jain et al. | 370/329 |
| 2014/0003320 A1* | 1/2014 | Etemad et al. | 370/312 |
| 2014/0086208 A1* | 3/2014 | Murray et al. | 370/331 |

FOREIGN PATENT DOCUMENTS

| | | |
|---|---|---|
| WO | 2011/112051 A2 | 9/2011 |
| WO | 2011/119680 A2 | 9/2011 |
| WO | 2013/155411 A1 | 10/2013 |

OTHER PUBLICATIONS

Cho et al. "Proposed 802.16 Standards Impact for Machine to Machine (M2M) Study Report" IEEE 802.16 Broadband Wireless Access Working Group, Apr. 21, 2010, 4 pages.

* cited by examiner

| Value (hexa-decimal) | RNTI | Usage | Transport Channel | Logic Channel |
| --- | --- | --- | --- | --- |
| Fixed (e.g., FFFC) | MC-RNTI | Multicast information transfer for small data transmission related information | PCH | PCCH |
| Variable (e.g., derived from IMSI) | | | | |

SMALL DATA COMMUNICATIONS IN A WIRELESS COMMUNICATION NETWORK

CROSS REFERENCE TO RELATED APPLICATIONS

The present application claims priority to U.S. Provisional Patent Application No. 61/624,185, filed Apr. 13, 2012, the entire specification of which is hereby incorporated by reference in its entirely for all purposes.

BACKGROUND

In general, machine-to-machine (M2M) communication or Machine Type Communication (MTC) may refer to technologies that allow wireless and wired systems to communicate with other devices without any human intervention. M2M communication may use a device such as, for example, a sensor or meter to collect information. The M2M device can communicate via a mobile network (e.g., wireless, wired, hybrid) with an MTC application server (e.g., software program) that can use or request data from the M2M device.

The expansion of mobile networks (e.g., broadband wireless access networks, wide area networks) across the world, along with the increased speed/bandwidth and reduced power of wireless communication, has facilitated the growth of M2M communication. Although the amount of data sent by M2M devices is very small, a large number of these devices connected to a wireless network and used concurrently may increase a data load and overhead expense on a network. Therefore, current techniques for transmitting small data payloads (e.g., machine type communication data) may be inefficient or incompatible with emerging mobile networks.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

With a wide range of potential applications, Machine Type Communication (MTC) or Machine to Machine (M2M) communication has gained large interest among equipment vendors, mobile network operators, and MTC specialist companies. As used herein, the terms M2M and MTC are used synonymously. MTC is a form of data communication among one or more entities that does not necessarily need human interaction. Generally, an MTC device can be a user equipment (UE) equipped for MTC. The UE can communicate through a Public Land Mobile Network (PLMN) with MTC servers and/or other MTC devices. In addition, the MTC device can communicate locally (e.g., wirelessly, through a personal area network (PAN), or hardwired) with other entities that provide the MTC device with data (e.g., a small data payload). Thereafter, the MTC device can process the data and then transmit the data to the MTC servers and/or other MTC devices. The MTC devices can include health monitoring devices, smart meters, sensors, etc.

The MTC server can communicate to the PLMN, as well as to the MTC devices (e.g., UEs configured for MTC) through the PLMN. In addition, the MTC server can be further configured to communicate with an Interworking Function (IWF) to trigger a transmission of a small data payload from the server to the MTC device.

MTC devices can transmit (i.e., send or receive) small amounts of data over a network. The small amount of data typically ranges from a few bits to kilobits of data. The network can be a wireless wide area network (WWAN) or wireless local area network (WLAN) based on a selected radio access network (RAN) technology. The WWAN can be configured to operate based on a cellular networking standard such as IEEE 802.16 standard, commonly referred to as WiMAX (worldwide interoperability for microwave access), and the third generation partnership project (3GPP). Releases of the IEEE 802.16 standard include the IEEE 802.16e-2005, 802.16-2009, and 802.16m-2011. Releases of the 3GPP standard include the 3GPP LTE, Release 8 in the fourth quarter of 2008, 3GPP LTE Advanced Release 10 in the first quarter of 2011, and 3GPP LTE Release 11 in the third quarter of 2012.

Standards such as WiFi or Bluetooth are used to provide wireless local area networks (WLAN). WiFi is a common name provided to an Institute of Electronics and Electrical Engineers (IEEE) 802.11 set of standards for communicating in unlicensed spectrum including the 2.4, 3.7 and 5 GHz frequency bands. The set of standards includes the IEEE 802.11a standard released in 1999 for communication in the 5 GHz and 3.7 GHz band, the IEEE 802.11b standard, also released in 1999 for communication in the 2.4 GHz band, the 802.11g standard released in 2003 for communication in the 2.4 GHz range via orthogonal frequency division multiplexing (OFDM) and/or direct sequence spread spectrum (DSSS), and the 802.11n standard released in 2009 for communication in the 2.4 GHz and 5 GHz bands using multiple-input multiple-output (MIMO).

In some examples, the MTC device can transmit the small data (e.g., measurements, temperature) via a WWAN or WLAN network in response to a request from an MTC server to send the small data. For example, the MTC server can communicate via an evolved packet core (EPC) of a 3GPP LTE network with a RAN having an eNB that can transmit a request for the data from the UE. In response to the request, the MTC device can wake up from an idle mode and send the small data. In another example, the MTC device can periodically wake up from an idle mode and send small data (e.g., measurements) to the server via the eNB. Generally, the small data is transmitted as a short data transfer in a single packet or burst. To reduce the overhead used to allow an MTC device to connect with a WWAN and transmit the small data, an indicator can be used to allow the wireless network to be aware that a small data transmission will occur. The indicator can be used by the wireless network to reduce the amount of overhead needed to connect to the network in order to communicate the small data transmission.

In one embodiment, the small data transmissions can have a minimal impact on the network by reducing signaling overhead, network resources, and/or delay for reallocation. In addition, the MTC device can be attached (e.g., by an established Radio Resource Control (RRC) connection) or detached to/from the network before transmission of the small data payload (e.g., when the small data payload transmission is triggered). In some embodiments, the UE can be connected with the eNB in an RRC connected mode or an idle mode when the small data payload transmission is triggered. The small data payload can be defined and/or configured per subscription or by a network operator policy. In some embodiments, the observed size of the instances of data exchange can be on the order of 1K (1024) octets. However, other sizes of data exchange are also possible, as can be appreciated.

The MTC device (or a UE supporting MTC applications) may transmit the small data in a downlink (i.e., from the eNB to the UE) or in an uplink (i.e., from the UE to the eNB). A downlink small data transmission can include a small data transmission indicator bit, along with an acknowledgement on the uplink. The acknowledgement can be a signal transmitted to indicate that one or more blocks of data have been successfully received and decoded. In some examples, the acknowledgement is not sent in response to the downlink small data transmission. The downlink small data transmission can include a small data command request to pull the data from the UE. In addition, an uplink small data transmission can include a small data transmission indicator bit, and an acknowledgement can be included on the downlink. The uplink small data transmission can occur after receiving a command request from the eNB.

The MTC applications that are executed on the MTC devices can be related to a variety of areas, such as security (e.g., surveillance systems, driver security), tracking and tracing (e.g., asset tracking, navigation, traffic information, road tolling), payment (e.g., vending machines, gaming machines), health (e.g., monitoring vital signs, supporting the elderly or handicapped), remote maintenance/control (e.g., sensors, lighting, vehicle diagnostics), metering (e.g., power, gas, water, heating), and/or consumer devices (e.g., digital cameras).

Figure 1:
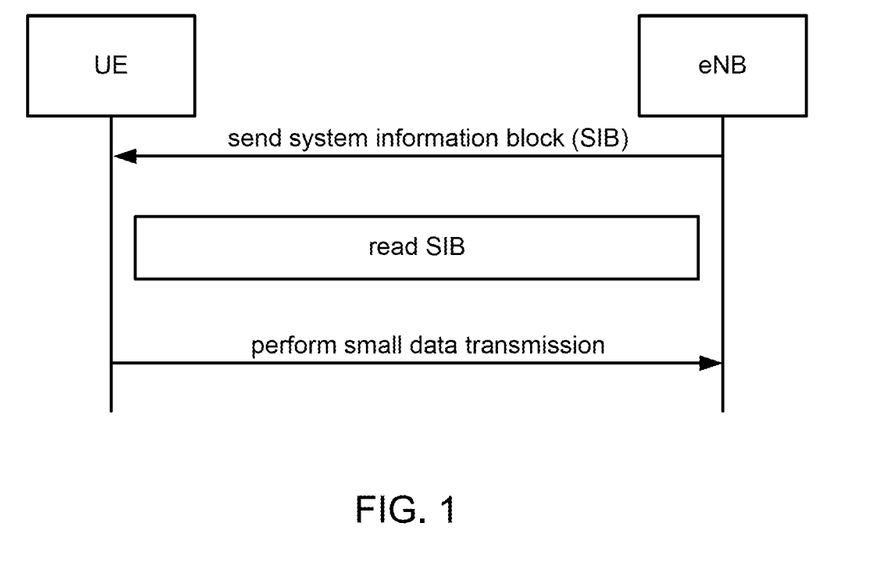
FIG. 1 schematically illustrates an example scheme for performing small data transmissions in accordance with an example.

FIG. 1 schematically illustrates an example scheme for performing small data transmissions in accordance with an example. An evolved node (eNB) can transmit a system information block (SIB), such as a SIB type 1 to the user equipment (UE). In some examples, the UE can include or be communicatively coupled with smart meters or sensors to collect small amounts of information for transmission (e.g., health monitoring devices, vending machines, and the like configured to collect information about temperature, inventory, etc.).

In general, the SIB can include system information that is to be broadcasted to the UE. The SIB can include a set of functionally-related parameters. For example, in Third Generation Partnership Project Long Term Evolution (3GPP LTE), the SIB can include a limited number of the most frequently transmitted parameters that are used by the UE to access a network. According to various embodiments of the present invention, the SIB can include system information related to small data transmissions for MTC. As will be discussed in further detail below, the UE generally needs to wake up from an idle mode in order to receive the SIB containing the system information.

In general, the SIB can include system information and/or configuration parameters that are specific to UEs that are configured for MTC. In addition, the SIB can include Extended Access Barring (EAB) information and/or Access Class Barring (ACB) information. The EAB information can be used to control Mobile Originating access attempts from UEs that are configured for EAB, in order to prevent an overload of the access network and/or the core network. In a congestion situation, an operator can restrict access from UEs that are configured for EAB, while permitting access to other UEs. The ACB information functions to restrict UE access attempts when the UE is not a member of at least one Access Class corresponding to permitted classes that are signaled over an air interface.

In one embodiment, a SIB type 1 (SIB1) can be used to communicate the small data transmission indicator bit. The SIB type 1 typically contains information relevant when evaluating if a UE is allowed to access a cell in a RAN. Also, the SIB1 can supply the UE with the scheduling of other system information.

After receiving the SIB from the eNB, the UE can read the system information included in the SIB. In some examples, the SIB can indicate updated system information in a different SIB (e.g., SIBx). The SIBx can include information relating to system parameters associated with small data transmissions for MTC devices. In other words, the UE can receive a SIB from the eNB, and the SIB can include a pointer to the SIBx. Thereafter, the UE can read the SIBx in order to read the updated system information.

In some embodiments of the present invention, the UE can read a small data transmission indicator in the system information included in the SIB. The small data transmission indicator can notify the UE that the eNB desires to transmit a small amount of data. In some examples, the UE can read a small data transmission command request in the system information. The small data transmission command request can notify the UE that the eNB is asking the UE to transmit a small data payload (e.g., measurement data, reporting data).

In addition, the UE can read a small data payload included in the system information block. The small data payload can include information associated with MTC applications involving security, health, metering, etc. In addition, the small data payload can include information, such as sensor or meter measurement, inventory level, etc. The data payload (e.g., MTC data payload) can be smaller than a preconfigured threshold to define a small data payload in some embodiments. In some embodiments, the preconfigured threshold can be set by a subscription or a network operator policy.

After reading the SIB, the UE can perform the small data transmission with the eNB, based on the system information included in the SIB, such as the SIB1. For example, the UE can read a small data transmission indicator in the system information, and then subsequently perform the small data transmission with the eNB. In some embodiments, the UE can perform the small data transmission by establishing a radio resource control (RRC) connection with the eNB. In general, the RRC protocol covers the broadcasting of system information. The RRC protocol handles the Layer 3 control plane signaling by which the evolved universal terrestrial radio access network (E-UTRAN) controls the behaviors associated with the UE. The E-UTRAN consists of eNBs and provides the E-UTRAN user plane and control plane (RRC) protocol terminations towards the UE. Alternatively, the UE can perform the small data transmission by executing a "fast" RRC connection with the eNB. As will be discussed in greater detail below, the "fast" RRC connection can involve fewer steps as compared to a typical RRC connection.

In one embodiment, when establishing an RRC connection, the UE can initiate the RRC connection while in RRC_IDLE mode. In other words, the UE can transition from RRC_IDLE mode to RRC_CONNECTED mode. The UE can send a RRCConnectionRequest message to the E-UTRAN. In response, the E-UTRAN can send an RRCConnectionSetup message to the UE. Upon the UE sending an RRCConnectionSetupComplete message to the E-UTRAN, the RRC connection is successfully established. If the RRC connection is not successfully established, then the E-UTRAN can send an RRCConnectionReject message in response to the RRCConnectionRequest message sent by the UE.

In addition, an RRC connection reconfiguration procedure can be used to modify the RRC connection. The RRC connection can be modified to establish, modify, and/or release radio bearers. The E-UTRAN (e.g., the eNB) can initiate the RRC connection reconfiguration procedure to a UE during an RRC_CONNECTED mode. The eNB can send an RRCConnectionReconfiguration message to the UE In response, the UE can send an RRCConnectionReconfigurationComplete message to the eNB thereby successfully reconfiguring the RRC connection. In general, one or more eNBs can be included in the E-UTRAN, but the UE may be connected to one eNB at any given time. If the RRC connection reconfiguration is not successfully established, then the UE and/or the eNB may begin an RRC connection re-establishment procedure.

In contrast to the RRC connection, the "fast" RRC connection may refer to an RRC connection that is executed between the UE and the E-UTRAN until the RRCConnectionSetupComplete phase. As previously discussed, upon the UE sending the RRCConnectionSetupComplete message to the E-UTRAN, the RRC connection is successfully established. A "fast" RRC connection does not include the messages exchanged related to bearer establishment between the UE and the E-UTRAN during the RRC Connection Reconfiguration. Generally, bearers can be described as an end-to-end tunnel or pipeline. The bearers are generally established when a continuous data stream is to be transmitted (e.g., starting a webpage download or a call). In addition, bearers can be established when the data has a larger size as compared to the small data. Therefore, when performing short data transfers (e.g., small data transmissions), it may be unnecessary to establish the bearers. Accordingly, a "fast" RRC connection can be used to more quickly form a connection between a UE and an eNB to communicate a small data transmission. Once the "fast" RRC connection is executed, the UE can indicate a desire to go into an RRC_IDLE mode.

In addition, the UE can perform or attempt a random access channel (RACH) communication in order to execute a "fast" RRC connection between the UE and the eNB. In general, RACH is a communication mechanism used by a UE to communicate with an eNB in order to initially synchronize the UE's transmission with the eNB. Additionally, RACH is a transport channel that can be used for access to the network when the UE does not have accurate uplink timing synchronization, or when the UE does not have an allocated uplink transmission resource. Therefore, after reading an indication of small data on downlink, the UE can initiate and perform RACH to enter the RRC_CONNECTED mode. Similarly, the UE can initiate and perform RACH to enter the RRC_CONNECTED mode after the UE reads a command request for new data to be sent on an uplink. Subsequent to the UE performing RACH, the UE can execute the "fast" RRC connection in order to perform the small data transmission.

In some embodiments, the UE can perform the small data transmission by executing a "fast" RRC connection with the eNB, in response to reading the small data transmission indicator (included in the SIB) received from the eNB. In some examples, the UE can perform the small data transmission by sending uplink measurement data or report data to the eNB, in response to reading the small data transmission request (included in the SIB) received from the eNB.

In addition, the UE can read a small data payload included in the SIB. The small data payload can be defined according to a subscription and/or a network operator policy. In addition, the small data payload can include small data relating to an application operating on the UE, such as a traffic congestion application, an energy wastage application, a home monitoring application, a parking guidance application, an electronic meter reading application, or another MTC type communication. In addition, the small data can be associated with applications related to a variety of different areas, such as security, health, metering, etc. In some cases, the UE can read the small data itself from the SIB, and does not establish either a "fast" RRC connection or a RRC connection, as the UE is not sending data on an uplink.

In some examples, the SIB can be received, by the UE from the eNB, based on a paging notification (or a paging message). The paging notification can include a small data transmission to indicate a pointer to updates in the SIB (e.g., a pointer to a new SIB1x). For example, the eNB can send a paging notification to the UE, indicating that the SIB includes system information related to small data transmissions to the MTC device (or the UE configured for MTC). The paging notification is received by the UE according to a paging cycle (or an equivalent cycle period) of the UE. In general, paging is a mechanism in which the eNB notifies the UE (which is in idle mode) of downlink data or a broadcast message to be sent to the UE. After the UE is woken up from idle mode and reads the contents of the paging message to learn of the updated system information, the UE can then initiate the appropriate procedures for receiving the SIB from the eNB. Since the paging mechanism generally occurs when the UE is in idle mode, the UE can monitor, in idle mode, whether the network is attempting to send any paging messages to the UE. During the idle mode, the UE may wake up to read the SIB based on a paging interval. In some examples, the SIB may be sent periodically to the UE. However, the paging mechanism may also occur during a connected mode of the UE. Thus, the SIB may be periodically sent to the UE, and then subsequently read by the UE, while in both idle mode and connected mode. In general, a paging message is a downlink broadcasted message that may notify UEs of an incoming call/data and/or a change in the system information (SI). The paging message can be sent subject to a paging cycle which defines how often (e.g., a default period or a modified period) the UE searches for a new paging message from the eNB.

In some examples, subsequent to the UE waking up from idle mode and reading the paging message from the eNB, the UE can determine an identifier of the paging message. If the identifier of the paging message matches an identifier of the UE, then the UE can proceed to establish an RRC connection with the eNB in order to receive the downlink data or broadcasted message from the eNB.

Figure 2:
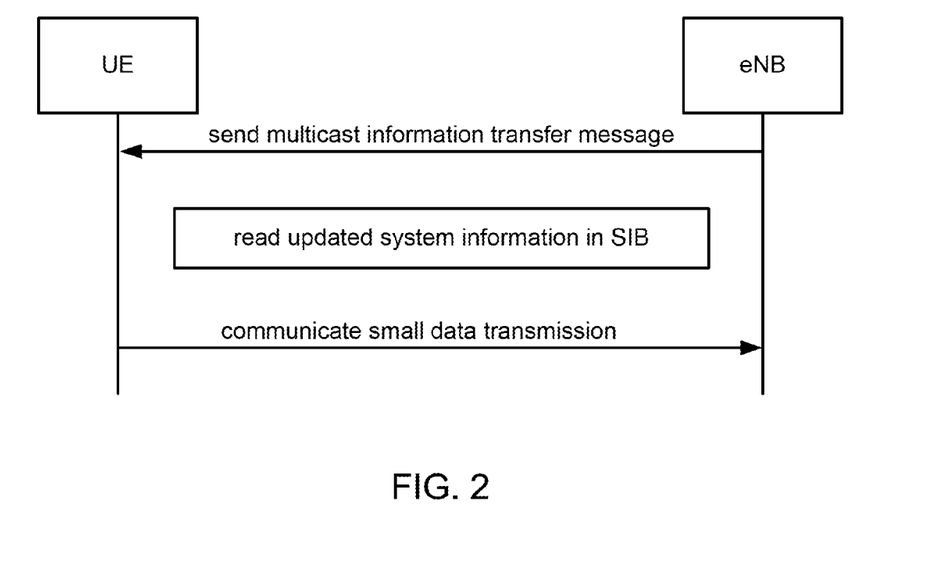
FIG. 2 schematically illustrates another example scheme for performing small data transmissions in accordance with an example.

FIG. 2 schematically illustrates an example scheme for performing small data transmissions in accordance with an example. For instance, a UE configured for MTC can receive a multicast information transfer message from an eNB. In other words, the multicast information transfer message can be used to convey information related to small data transmissions. In addition, the multicast information transfer message can be used to transmit MTC-related notifications (e.g., data pertaining to MTC activities, such as an energy wastage warning in a smart grid, upcoming traffic congestion in an MTC application related to road side assistance).

The multicast information transfer message can notify the UE of updated system information in a SIB relating to the small data transmission. The multicast information transfer message can include the new SIB received by the UE. In some examples, the multicast information transfer message can include a pointer to a new SIB (e.g., SIB1x) containing updated system information. Thereafter, the UE can read the SIB1x, and based on the parameters contained in the SIBx, perform the small data transmission.

In some embodiments of the present invention, the multicast information transfer message can be received by the UE during an RRC idle mode. Furthermore, the multicast information transfer message can be received in a paging cycle of the UE during the RRC idle mode. In other words, the multicast information transfer message may page the UE while in idle mode. The paging cycle can be a Default Paging Cycle, or the paging cycle can be new cycles that are defined specifically for delay tolerant devices and/or MTC devices or MTC applications. The Default Paging Cycle can include values of 32, 64, 128, and 256 radio frames can be used. The radio frames can each be 10 milliseconds (ms) in length. The number of radio frames can be further increased for MTC devices (e.g., 1024 radio frames) depending on the frequency of the multicast transfer information messages sent by the eNB. Thus, multicast information transfer messages that are transmitted with low frequency may result in a higher number of radio frames. Based on the paging cycle (either an existing paging cycle or a new paging cycle developed specifically for delay tolerant devices), the UE can periodically search for paging messages received from the eNB.

In some examples, the multicast information transfer message can include a small data payload, as well as an updated SIB including a small data transmission indicator and/or a small data command request.

In some embodiments of the present invention, the UE can read the updated system information in the SIB when notified of the change to the SIB by the multicast information transfer message from the eNB, wherein the updated system information in the SIB relates to small data transmissions communicated by the UE. For example, the UE can read a small data transmission indicator in the updated system information, wherein the updated system information is received by the UE in the multicast information transfer message. In addition, the UE can read a small data transmission command request in the updated system information, wherein the updated system information is received by the UE in the multicast information transfer message. Furthermore, the UE can read a small data payload in the multicast information transfer message.

In some examples, the UE can communicate the small data transmission to the eNB, based on the updated system information included as part of the multicast information transfer message. If the SIB includes a small data indicator, then the UE can receive the small data on downlink. In contrast, if the SIB includes a small data request, then the UE can send the small data on uplink. In some examples, the UE can perform the small data transmission by establishing an RRC connection, with the eNB, in response to the small data transmission indicator received in the multicast information transfer message. Alternatively, the UE can perform the small data transmission by executing a "fast" RRC connection, as previously discussed. In addition, the UE can perform the small data transmission by sending uplink measurement data, to the eNB, in response to the small data transmission command request received as part of the multicast information transfer message.

In some examples, the UE can monitor a Physical Downlink Control Channel (PDCCH) during the RRC idle mode of the UE in order to identify a paging message that indicates a new multicast information transfer message. In general, the PDCCH is a downlink control channel used to transfer control information to mobile devices (e.g., MTC devices). The PDCCH can define the configurations of the paging channel and the shared downlink channels. In addition, the PDCCH can define the uplink transmission scheduling information in order to coordinate access control to a radio system. In addition, the UE can monitor the PDCCH channel at regular intervals based on discontinuous reception (DRX) parameters that are suitable for delay tolerant UEs. In other words, the DRX parameters can determine the periods when the UE is to wake up from the idle mode, and then check for paging messages received from the eNB. In some examples, the UE can monitor the PDCCH channel at regular intervals based on parameters other than DRX parameters.

Figure 3:
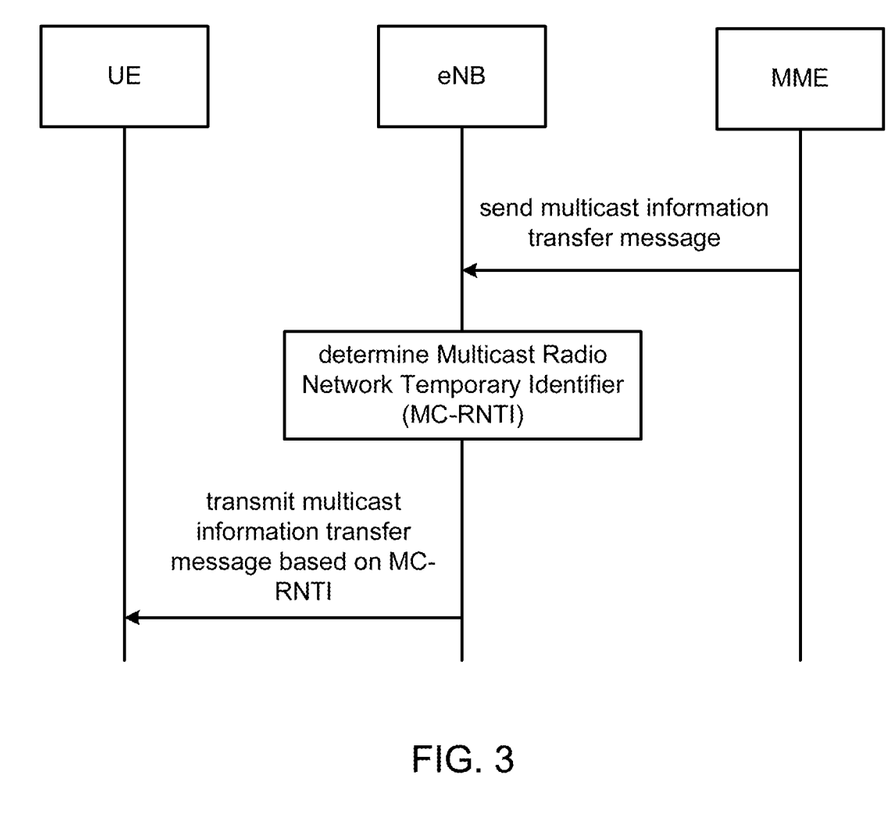
FIG. 3 schematically illustrates an example scheme for transmitting multicast information transfer messages in accordance with an example.

FIG. 3 schematically illustrates an example scheme for transmitting multicast information transfer messages in accordance with an example. For example, an eNB can contain circuitry to receive a multicast information transfer message from a Mobility management Entity (MME). In general, the MME is the control node that processes the signaling between the UE and the Core Network (CN). In addition, the MME supports functions related to bearer and connection management. The multicast information transfer message can be initiated by an MTC server (or other element in the network), and then sent to the MME, which subsequently sends the multicast information transfer message to the eNB. In some examples, the multicast information transfer message can be initiated by the MME. As previously discussed, the multicast information transfer message can include a small data payload, a small data transmission indicator, or a small data transmission command request. The small data payload can include data related to an MTC application, such as a traffic congestion application, an energy wastage application, a home monitoring application, a parking guidance application, an electric meter reading application, and/or other applications involving small data transmission between MTC devices and MTC servers.

In some examples, the eNB can determine a Radio Network Temporary Identifier (RNTI) used for transmitting the multicast information transfer message to the UE. The RNTI can be used to identify UEs within an E-UTRAN, and particularly in signaling messages between the UE and the E-UTRAN. In particular, the eNB can determine a RNTI specifically related to multicast (e.g., MC-RNTI). The MC-RNTI can be a fixed value (e.g., FFFC) or a variable value. The variable value can be derived at the eNB using an International Mobile Subscriber Identity (IMSI) received from the MME. In general, the IMSI is a unique number associated with each UE (e.g., MTC device).

Based on the MC-RNTI, the eNB can transmit the multicast information transfer message to the UE. In other words, the eNB can transmit the multicast information transfer message to a UE having a corresponding MC-RNTI. Furthermore, the MME can transmit the multicast information transfer message to the eNB using a S1 Application Protocol (S1AP). In addition, the eNB can transmit the multicast information transfer message to the UE using a RRC connection or a "fast" RRC connection. Depending on the information included in the multicast information transfer message (e.g., small data payload, small data transmission indicator, small data transmission command request), either an RRC connection or a "fast" RRC connection can be used.

In addition, the UE can identify the MC-RNTI by monitoring the PDCCH, based on the DRX parameters or other parameters, for the MC-RNTI values. In other words, if the PDCCH contains the MC-RNTI value, then the UE is notified of a new multicast information transfer message. The MC-RNTI can indicate to the UE that the enB is sending the multicast information transfer message.

Figure 4:
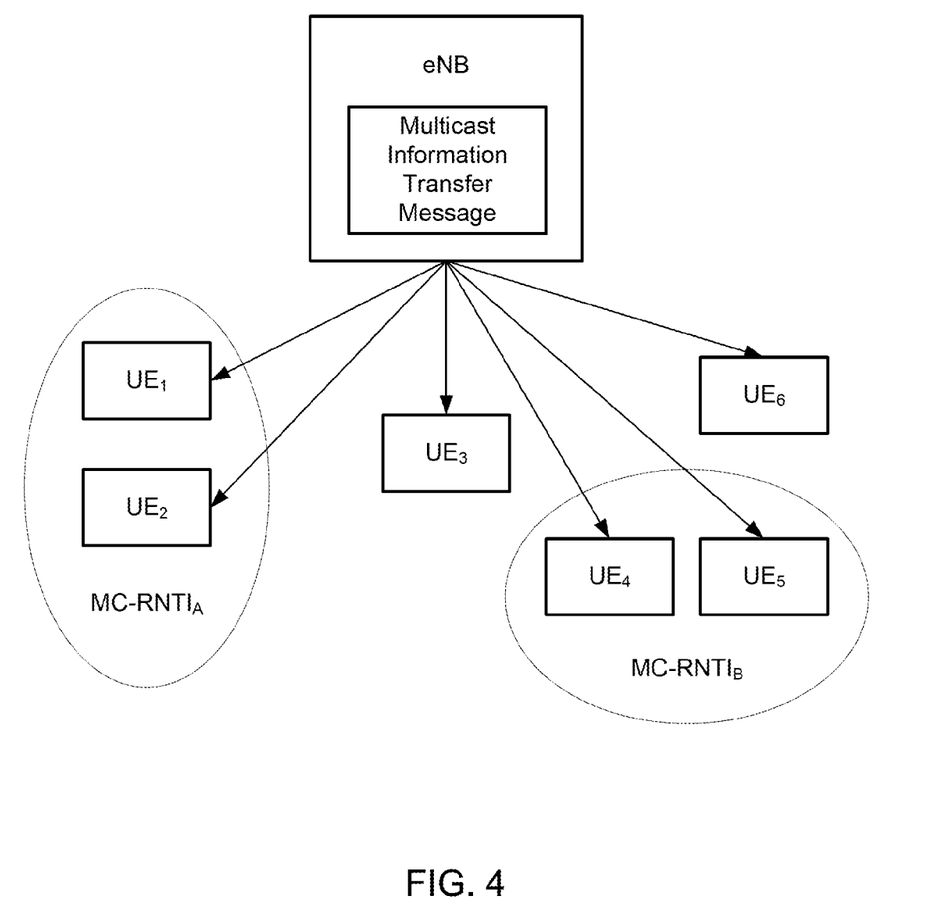
FIG. 4 schematically illustrates another example scheme for transmitting multicast information transfer messages in accordance with an example.

FIG. 4 schematically illustrates another example scheme for transmitting multicast information transfer messages in accordance with an example. For example, the eNB can transmit a multicast information transfer message to a specific UE, a single multicast group of UEs, or a plurality of multicast groups of UEs. If the MC-RNTI is fixed, the eNB can transmit the multicast information transfer message to a single multicast group of UEs. In other words, a fixed MC-RNTI has one multicast group per eNB. For example, an energy wastage application may use a fixed MC-RNTI if the eNB only sends multicast information transfer messages to the UEs using that application. In some examples, the MC-RNTI is variable, which enables the eNB to send the multicast information transfer message to a plurality of multicast groups of UEs. As previously discussed, the MC-RNTI can be used to identify selected UEs within an E-UTRAN.

As an example, an eNB can transmit small data to a specific UE based on a health-related MTC application. As another example, the eNB can transmit a small data transmission command request relating to a home monitoring application to a single multicast group of UEs. In addition, the eNB can transmit a small data transmission indicator relating to a traffic congestion application to a plurality of multicast groups of UEs.

As illustrated in FIG. 4, an eNB can transmit a multicast information transfer message to a plurality of UEs (e.g., $UE_1$, $UE_2$, $UE_3$, $UE_4$, $UE_5$ and $UE_6$). As an example, $UE_1$ and $UE_2$ can be included in a single multicast group according to $MC\text{-}RNTI_A$. In addition, $UE_4$ and $UE_5$ can be included in a single multicast group according to $MC\text{-}RNTI_B$. In some examples, $UE_3$ and $UE_6$ can be specific UEs that receive the multicast information transfer message from the eNB.

Figure 5:
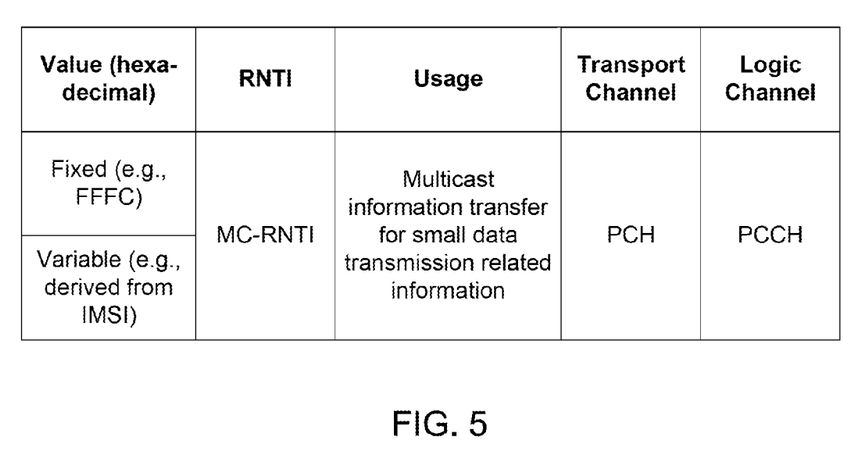
FIG. 5 is a table showing example values associated with multicast information transfer messages in accordance with an example.

FIG. 5 is a table showing example values for multicast information transfer messages in accordance with an example. As previously discussed, the multicast information transfer messages can be used for small data transmissions. The values may include hexadecimal values that are fixed (e.g., FFFC). In addition, the values can be variable values that are derived from the IMSI. The RNTIs used specifically to identify multicast information transfer messages can be referred to as MC-RNTIs. In addition to MC-RNTIs, there can be various other types of RNTIs, such as Cell-RNTI (C-RNTI), Paging-RNTI (P-RNTI), Random Access-RNTI (RA-RNTI), and System Information-RNTI (SI-RNTI).

The values (both fixed and variable) related to transmitting the multicast information transfer messages can be associated with a paging channel (PCH) used as the transport channel. The PCH is a downlink transport channel used to transport paging information to UEs. The PCH can also be used to inform UEs about updates in the system information. In addition, the values (both fixed and variable) can be associated with a paging control channel (PCCH) used as the logic channel. The PCCH is a downlink logical channel which his used to notify UEs of a change in the system information.

Figure 6:
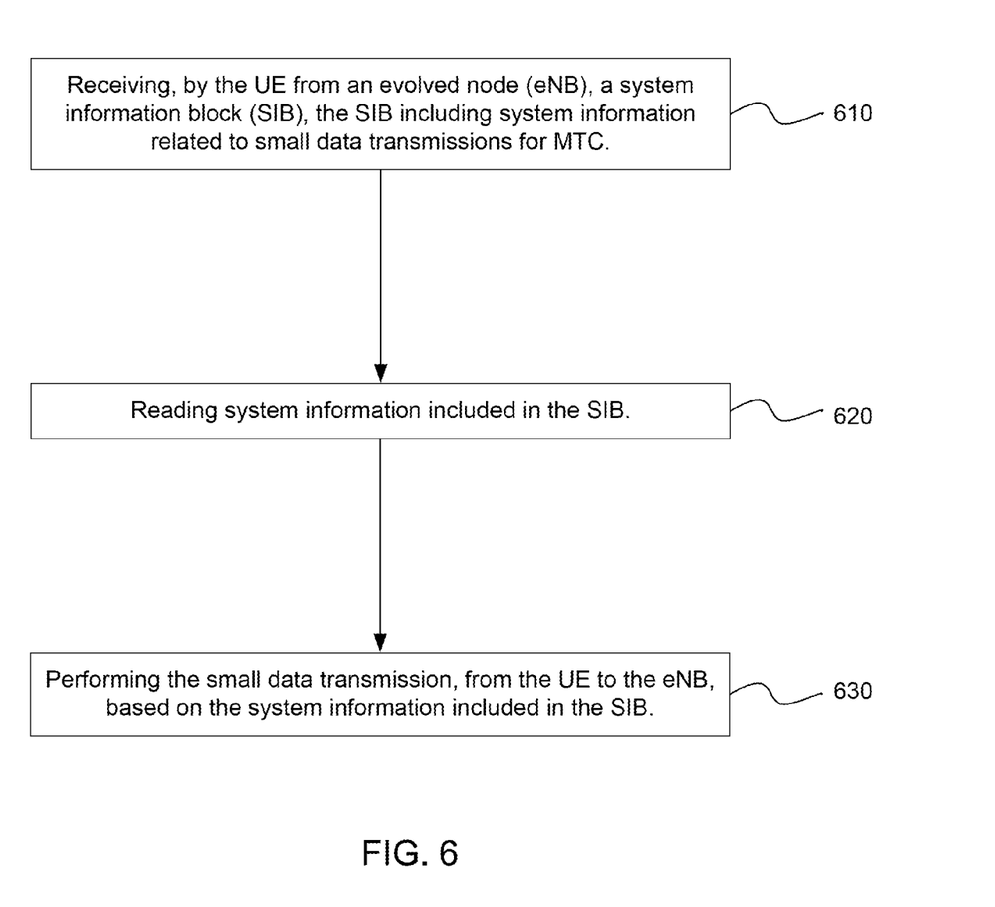
FIG. 6 depicts a flow chart of a method for enabling small data transmissions in a user equipment configured for machine type communication in accordance with an embodiment of the present invention.

FIG. 6 depicts a flow chart of a method 600 for enabling small data transmissions in a user equipment (UE) configured for machine type communication (MTC) in accordance with an embodiment of the present invention. The method includes the operation of receiving 610, by the UE from an evolved node (eNB), a system information block (SIB). The SIB can include information related to small data transmissions for MTC. The method 600 further comprises reading 620 system information included in the SIB. The method 600 can further comprise performing 630 the small data transmission, from the UE to the eNB, based on the system information included in the SIB.

The method 600 can also include the operations of reading a small data transmission indicator in the system information included in the SIB and performing the small data transmission by executing a fast radio resource connection (RRC), by the UE with the eNB, in response to the small data transmission indicator received from the eNB.

The method 600 can also include the operations of reading a small data transmission command request in the system information included in the SIB and performing the small data transmission by sending uplink measurement data, by the UE to the eNB, in response to the small data transmission command request received from the eNB. In addition, the method 600 can include the operation of reading a small data payload in the SIB, received from the eNB at the UE, wherein the small data payload is defined according to at least one of: a subscription; and a network operator policy.

In one embodiment, the operation of reading a small data payload in the SIB in the method 600 can include reading small data, at the UE, related to at least one of: a traffic congestion application; an energy wastage application; a home monitoring application; a parking guidance application; and an electric meter reading application.

In one embodiment, the operation of executing the fast RRC connection in the method 600 can include executing a RRC connection setup phase, without an establishment of bearers, between the UE and the eNB.

In one embodiment, the operation of performing the small data transmission, from the UE to the eNB, based on the system information included in the SIB, in the method 600 can include forming a connection between the UE and the eNB after reading the SIB using a random access channel (RACH) and executing the fast RRC connection between the UE and the eNB in order to perform the small data transmission. The method 600 can also include entering an RRC idle mode by the UE after executing the fast RRC connection.

In one embodiment, the operation of receiving, by the UE from the eNB, a SIB, in the method 600 can include receiving, at the UE from the eNB, a paging notification indicating that the SIB includes system information related to the UE, wherein the paging notification is received according to a paging cycle of the UE.

Figure 7:
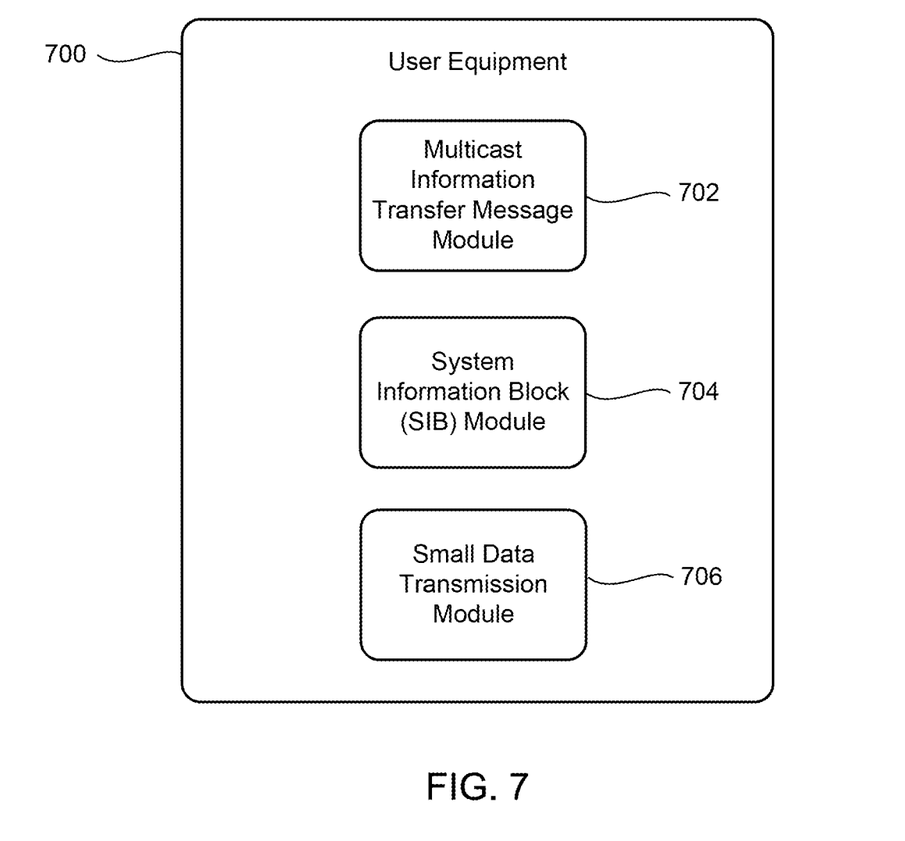
FIG. 7 illustrates a block diagram of a user equipment in accordance with an example.

FIG. 7 illustrates an example user equipment (UE) 700 configured for machine type communication (MTC), as shown in another embodiment of the present invention. The UE comprises a multicast information transfer message module 702 operable to receive a multicast information transfer message, at the UE from an evolved node (eNB). The multicast information transfer message can notify the UE of updated system information in a system information block (SIB) related to small data transmissions by the UE. A SIB module 704 is configured to read the updated system information in the SIB when notified of the change in the SIB by the multicast information transfer message from the eNB. The updated system information in the SIB can relate to small data transmissions communicated by the UE. A small data transmission module 706 is configured to communicate the small data transmission to the eNB. The small data transmission can be based on the updated system information included as part of the multicast information transfer message.

In some embodiments, the multicast information transfer message module 702 can be further configured to receive the multicast information transfer message from the eNB during a radio resource control (RRC) idle mode of the UE. In addition, the multicast information transfer message module 702 can be further configured to receive the multicast information transfer message from the eNB in a paging cycle of the UE during the RRC idle mode. In some embodiments of the present disclosure, the multicast information transfer message can include at least one of: a small data payload; a small data transmission indicator; and a small data command request.

In some embodiments, the multicast information transfer message module 702 can be configured to read a small data payload in the multicast information transfer message. In addition, the multicast information transfer message module 702 can include monitoring a Physical Downlink Control Channel (PDCCH) during the RRC idle mode of the UE and identifying a Multicast Radio Network Temporary Identifier (MC-RNTI) indicating that the multicast information transfer message is received from the eNB.

In some embodiments, the SIB module 704 can be configured to read a small data transmission indicator in the updated system information, wherein the updated system information is received by the UE in the multicast information transfer message. In addition, the SIB module 704 can be configured to read a small data transmission command request in the updated system information, wherein the updated system information is received, by the UE in the multicast information transfer message.

In some embodiments, the small data transmission module 706 can be configured to perform the small data transmission by establishing a radio resource connection (RRC) with the eNB, in response to the small data transmission indicator received in the multicast information transfer message. In addition, the small data transmission module 706 can be configured to perform the small data transmission by sending uplink measurement data, by the UE to the eNB, in response to the small data transmission command request received as part of the multicast information transfer message.

In some embodiments of the present invention, the example user equipment (UE) 700 can be configured to communicate with an evolved node (eNB). The eNB may contain circuitry configured to receive a multicast information transfer message from a Mobility Management Entity (MME); determine a Multicast Radio Network Temporary Identifier (MC-RNTI) used for transmitting the multicast information transfer message to a user equipment (UE), wherein the MC-RNTI is one of a fixed value or a variable value that is derived at the eNB using an International Mobile Subscriber Identity (IMSI) received from the MME; and transmit the multicast information transfer message, from the eNB to the UE, based on the MC-RNTI of the UE.

In one embodiment, the multicast information transfer message can include at least one of a: a small data payload, a small data transmission indicator, and a small data transmission command request. In addition, the small data payload can include at least one of: a traffic congestion application; an energy wastage application; a home monitoring application; a parking guidance application; and an electric meter reading application.

In some embodiments, the eNB may include circuitry configured to transmit the multicast information transfer message to at least one of: a specific UE, a single multicast group of UEs based on the fixed MC-RNTI, and a plurality of multicast groups of UEs based on the variable MC-RNTI, wherein the MC-RNTI is used to identify selected UEs within an Evolved Universal Mobile Telecommunications System Terrestrial Radio Access Network (E-UTRAN).

In some embodiments, the present disclosure can include at least one non-transitory computer readable medium having instructions stored thereon for enabling small data transmissions in a user equipment (UE) configured for machine type communication (MTC), the instructions when executed on a machine to cause the machine to: receive, by the UE from an evolved node (eNB), a system information block (SIB) including system information related to small data transmissions for MTC; read, by the UE, the SIB including the system information related to the small data transmissions; and perform the small data transmissions, from the UE to the eNB, based on the system information read by the UE.

In one embodiment, the system information included in the computer readable medium can include at least of: a small data transmission indicator; a small data transmission command request; and a small data payload.

In some embodiments, the computer readable medium can include instructions stored thereon for reading the SIB based on receiving a multicast information transfer message from the eNB during a radio resource control (RRC) idle mode of the UE, wherein the multicast information transfer message indicates that system information related to small data transmissions is included in the SIB.

Figure 8:
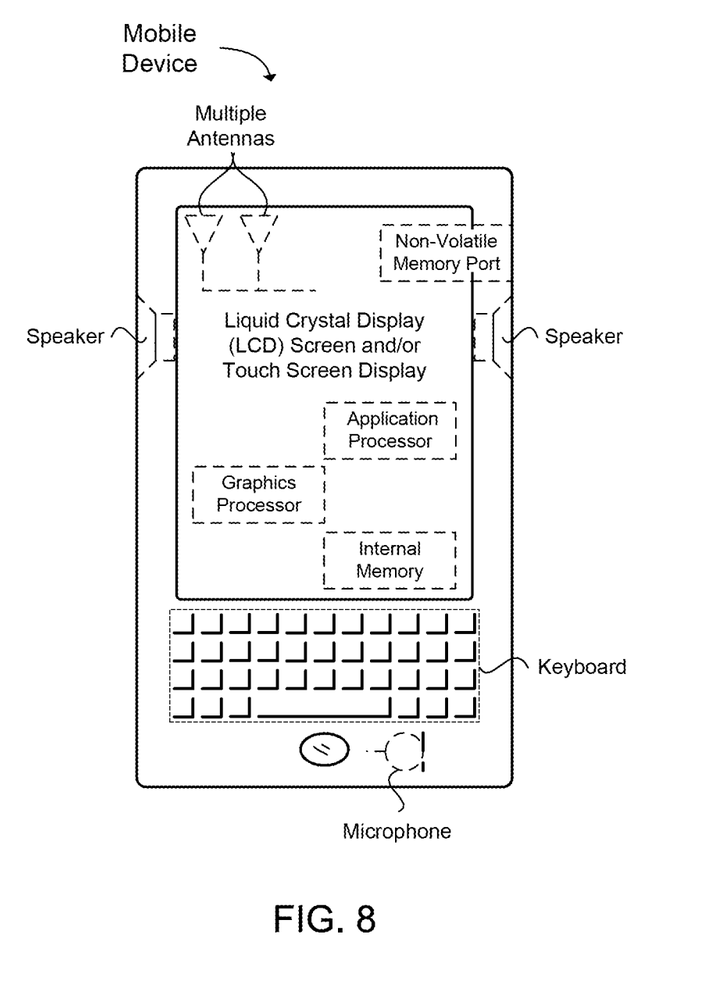
FIG. 8 illustrates a mobile wireless device in accordance with an example.

FIG. 8 provides an example illustration of a mobile communication device, such as a user equipment (UE), a mobile station (MS), a mobile wireless device, a tablet, a handset, or another type of mobile wireless device. The mobile device can include one or more antennas configured to communicate with a base station (BS), an evolved Node B (eNB), or other type of wireless wide area network (WWAN) access point. While two antennas are shown, the mobile device may have between one and four or more antennas. The mobile device can be configured to communicate using at least one wireless communication standard including 3GPP LTE, Worldwide Interoperability for Microwave Access (WiMAX), High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 8 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for enabling small data transmissions in a user equipment (UE) configured for machine type communication (MTC), the method comprising:
   receiving, by the UE from an evolved node (eNB), a system information block (SIB), the SIB including system information related to small data transmissions for MTC;
   reading a small data transmission indicator in the system information included in the SIB;
   executing, by the UE, a fast radio resource connection (RRC) with the eNB in response to the small data transmission indicator received from the eNB, wherein the fast RRC connection is executed without the establishment of bearers between the UE and the eNB; and
   performing the small data transmission, from the UE to the eNB, based on the system information included in the SIB.

2. The method of claim 1, further comprising:
reading a small data transmission command request in the system information included in the SIB; and
performing the small data transmission by sending uplink measurement data, by the UE to the eNB, in response to the small data transmission command request received from the eNB.

3. The method of claim 1, further comprising reading a small data payload in the SIB, received from the eNB at the UE, wherein the small data payload is defined according to at least one of: a subscription; and a network operator policy.

4. The method of claim 3, wherein reading a small data payload in the SIB includes reading small data, at the UE, related to at least one of:
a traffic congestion application;
an energy wastage application;
a home monitoring application;
a parking guidance application; or
an electric meter reading application.

5. The method of claim 1, wherein performing the small data transmission, from the UE to the eNB, based on the system information included in the SIB, further comprises:
forming a connection between the UE and the eNB after reading the SIB using a random access channel (RACH); and
executing the fast RRC connection between the UE and the eNB in order to perform the small data transmission.

6. The method of claim 1, further comprising entering an RRC idle mode by the UE after executing the fast RRC connection.

7. The method of claim 1, wherein receiving, by the UE from the eNB, a SIB, further comprises receiving, at the UE from the eNB, a paging notification indicating that the SIB includes system information related to the UE, wherein the paging notification is received according to a paging cycle of the UE.

8. A user equipment (UE) configured for machine type communication (MTC), the UE comprising:
a multicast information transfer message module configured to receive a multicast information transfer message, at a user equipment (UE) from an evolved node (eNB), wherein the multicast information transfer message notifies the UE of updated system information in a system information block (SIB) related to small data transmissions by the UE, wherein the multicast information transfer message module is implemented in a first hardware circuit or is comprised of code that is stored in one or more digital memory devices to be executed by one or more processors;
a system information block (SIB) module configured to read the updated system information in the SIB when notified of the change in the SIB by the multicast information transfer message from the eNB, wherein the updated system information in the SIB comprises a small data transmission indicator, wherein the system information block (SIB) module is implemented in a second hardware circuit or is comprised of code that is stored in the one or more digital memory devices to be executed by the one or more processors; and
a small data transmission module configured to communicate the small data transmission to the eNB by executing a fast radio resource connection (RRC), in response to the small data transmission indicator received from the eNB, wherein executing the fast RRC connection comprises executing a RRC connection setup phase, without an establishment of bearers, between the UE and the eNB and wherein the small data transmission module is implemented in a third hardware circuit or is comprised of code that is stored in the one or more digital memory devices to be executed by the one or more processors.

9. The UE of claim 8, wherein the multicast information transfer message module is further configured to receive the multicast information transfer message from the eNB during a radio resource control (RRC) idle mode of the UE.

10. The UE of claim 9, wherein the multicast information transfer message module is further configured to receive the multicast information transfer message from the eNB in a paging cycle of the UE during the RRC idle mode.

11. The UE of claim 9, wherein the multicast information transfer message module further comprises:
monitoring a Physical Downlink Control Channel (PDCCH) during the RRC idle mode of the UE; and
identifying a Multicast Radio Network Temporary Identifier (MC-RNTI) indicating that the multicast information transfer message is received from the eNB.

12. The UE of claim 8, wherein the multicast information transfer message includes at least one of:
a small data payload; or
a small data command request.

13. The UE of claim 8, further comprising:
the SIB module configured to read a small data transmission command request in the updated system information, wherein the updated system information is received, by the UE in the multicast information transfer message; and
the small data transmission module configured to perform the small data transmission by sending uplink measurement data, by the UE to the eNB, in response to the small data transmission command request received as part of the multicast information transfer message.

14. The UE of claim 8, further comprising the multicast information transfer message module configured to read a small data payload in the multicast information transfer message.

15. An evolved node (eNB) comprising:
a first hardware circuit configured to receive a multicast information transfer message from a Mobility Management Entity (MME);
a second hardware circuit configured to determine a Multicast Radio Network Temporary Identifier (MC-RNTI) used for transmitting the multicast information transfer message to a user equipment (UE), wherein the MC-RNTI is one of a fixed value or a variable value that is derived at the eNB using an International Mobile Subscriber Identity (IMSI) received from the MME; and
a third hardware circuit configured to transmit the multicast information transfer message, from the eNB to the UE, based on the MC-RNTI of the UE.

16. The eNB of claim 15, wherein the multicast information transfer message includes at least one of a: a small data payload or a small data transmission command request.

17. The eNB of claim 15, wherein the small data payload includes data related to at least one of:
a traffic congestion application;
an energy wastage application;
a home monitoring application;
a parking guidance application; or
an electric meter reading application.

18. The eNB of claim 15, wherein the third hardware circuit is further configured to transmit the multicast information transfer message to at least one of: a specific UE, a single multicast group of UEs based on the fixed MC-RNTI, and a plurality of multicast groups of UEs based on the variable MC-RNTI, wherein the MC-RNTI is used to identify selected UEs within an Evolved Universal Mobile Telecommunications System Terrestrial Radio Access Network (E-UTRAN).

19. At least one non-transitory computer readable medium storing instructions which, when executed by a processor, perform the following operations for enabling small data transmissions in a user equipment (UE) configured for machine type communication (MTC), the operations comprising:

receiving, by the UE from an evolved node (eNB), a system information block (SIB) including system information related to small data transmissions for MTC;

reading, by the UE, the SIB including a small data transmission indicator in the system information related to the small data transmissions;

executing, by the UE, a fast radio resource connection (RRC) with the eNB in response to the small data transmission indicator received from the eNB, wherein the fast RRC connection is executed without the establishment of bearers between the UE and the eNB; and performing the small data transmissions transmission, from the UE to the eNB, based on the system information read by the UE.

20. The at least one non-transitory computer readable medium of claim 19, wherein the system information related to small data transmissions for MTC includes at least one of:

a small data transmission command request; or a small data payload.

21. The at least one non-transitory computer readable medium of claim 19, further comprising instructions which when executed by a processor perform the following:

read the SIB based on receiving a multicast information transfer message from the eNB during a radio resource control (RRC) idle mode of the UE, wherein the multicast information transfer message indicates that system information related to small data transmissions is included in the SIB.

* * * * *